United States Patent
Sato et al.

(10) Patent No.: US 6,804,590 B2
(45) Date of Patent: Oct. 12, 2004

(54) ELECTRONIC APPARATUS AND DATA RECORDING METHOD IN ELECTRONIC APPARATUS

(75) Inventors: Tsuyoshi Sato, Tsurugashima (JP); Tamami Oda, Tsurugashima (JP); Tomo Watanabe, Tsurugashima (JP)

(73) Assignee: Pioneer Corporation, Tokyo-to (JP)

(*) Notice: Subject to any disclaimer, the term of this patent is extended or adjusted under 35 U.S.C. 154(b) by 0 days.

(21) Appl. No.: 10/233,113

(22) Filed: Sep. 3, 2002

(65) Prior Publication Data

US 2003/0045977 A1 Mar. 6, 2003

(30) Foreign Application Priority Data

Sep. 3, 2001 (JP) .................................. 2001-266389
Sep. 28, 2001 (JP) .................................. 2001-304441

(51) Int. Cl.[7] .............................................. G06F 7/00
(52) U.S. Cl. .................................... 701/35; 701/31
(58) Field of Search ..................... 701/35, 29, 207, 701/202, 206, 209, 213, 31; 340/988, 901

(56) References Cited

U.S. PATENT DOCUMENTS 4,853,856 A * 8/1989 Hanway ...................... 701/35
5,044,662 A * 9/1991 Kawabata .................. 280/5.501
6,125,323 A * 9/2000 Nimura et al. .............. 701/207
2002/0067286 A1 * 6/2002 Hsu et al. ................... 340/901

FOREIGN PATENT DOCUMENTS

| JP | 58041246 | 3/1983 |
| JP | 62152946 | 7/1987 |
| JP | 02110855 | 4/1990 |

* cited by examiner

Primary Examiner—Thomas G. Black
Assistant Examiner—Ronnie Mancho
(74) Attorney, Agent, or Firm—Morgan, Lewis & Bockius LLP

(57) ABSTRACT

In a vehicle-installed AV device, the power is supplied to various sections of the vehicle-installed AV device via a key switch from a battery of a vehicle. The vehicle-installed AV device is provided with: a predicting/detecting section for detecting a running state of the vehicle to predict an engine stop; a flash memory and a main memory for storing operation data of the vehicle-installed AV device; and a CPU for controlling the flash memory and the main memory. When the predicting/detecting section predicts the engine stop, the operation data stored in the main memory is written into the flash memory.

12 Claims, 9 Drawing Sheets

ELECTRONIC APPARATUS AND DATA RECORDING METHOD IN ELECTRONIC APPARATUS

BACKGROUND OF THE INVENTION

1. Field of the Invention

The present invention belongs to a technical field of vehicle-installed electronic devices and, more specifically, to a technical field of electric power feeding in vehicle-installed electronic devices.

2. Description of the Related Art

In recent years, it has been popularized to install various electronic devices, such as audio devices, video devices and navigation devices, in vehicles. Normally, these electronic devices are each operated by receiving power feeding from a battery provided in a vehicle.

In general, when the power feeding is carried out from the battery to such a vehicle-installed electronic device, the electric power is supplied based on power supply lines of two systems comprised of: an accessory (ACC) power supply in which the electric power is supplied from the battery via a key switch provided in the vehicle; and a backup power supply in which the electric power is constantly supplied from the battery, i.e. not linking to the key switch. The ACC power supply is constituted along with a starter switch for starting an engine and, when an ignition switch or an accessory (ACC) switch turns to ON state, it feeds the electric power to the vehicle-installed electronic device. A schematic structure relating to the power supplies for such a vehicular electronic device is shown in FIG. 9.

An electronic device 10 shown in FIG. 9 is provided with: an ACC power supply monitor section 11 which is connected to an ACC power supply line 3 connected to a battery 1 via a key switch 2 and monitors a state in which the electric power is fed to the ACC power supply line 3 (hereinafter referred to as "energized state"); a central processing unit (hereinafter referred to as "CPU") 15 and a flash memory 16 each connectable to a backup power supply line 4 connected to the battery 1; and a main memory 17 connected to the backup power supply line 4. The CPU 15 and the flash memory 16 are connected to the backup power supply line 4 via control switches 12 and 13, respectively, which are controlled by the ACC power supply monitor section 11.

The ACC power supply monitor section 11 is connected to the backup power supply line 4 and also mutually connected to the CPU 15, and detects the presence/absence of energization in the ACC power supply line 3, thereby to output a result of the detection to the CPU 15.

Specifically, when the energized state of the ACC power supply line 3 is detected, the ACC power supply monitor section 11 turns on the control switches 12 and 13 to connect the backup power supply line 4 to the CPU 15 and the flash memory 16 for energization thereof.

On the other hand, when the ACC power supply monitor section 11 detects a state in which the electric power is not fed to the ACC power supply line 3 (hereinafter referred to as "interrupted state"), it outputs a result of the detection to the CPU 15 when the interrupted state is detected.

After notifying the CPU 15 of the detection of the interrupted state, the ACC power supply monitor section 11 is notified from the CPU 15 that data about operations (hereinafter referred to as "operation data") has been stored in the main memory 17 (hereinafter referred to as "OFF processing"), which will be described later. When the execution of the OFF processing is notified, the ACC power supply monitor section 11 controls the respective control switches 12 and 13 to be turned off, thereby to interrupt the power feeding to the CPU 15 and the flash memory 16.

The CPU 15 controls the flash memory 16 and the main memory 17 based on the presence/absence of energization in the ACC power supply line 3.

Specifically, when the electric power is first fed to the vehicle-installed electronic device 10 after it has been disposed, the CPU 15 controls the flash memory 16 to output operation data such as initial data and operation programs stored therein to the main memory 17. After the operation data has been outputted to the main memory 17, i.e. once the power feeding has been started, even if the power feeding through the ACC power supply line 3 is interrupted, the operation data can be held in the main memory 17 which is constantly supplied with the electric power through the backup power supply line 4. The CPU 15 executes reading of operation data stored in the main memory 17 and writing of operation data into the main memory 17, and further executes a control of respective sections (not shown) which perform navigation and AV operations.

Further, when the power feeding through the ACC power supply line 3 is interrupted, i.e. upon notification of the interrupted state of the ACC power supply line 3 from the ACC power supply monitor section 11, the CPU 15 executes the OFF processing to write the operation data into the main memory 17. After completion of the OFF processing, the CPU 15 notifies the ACC power supply monitor section 11 that the OFF processing has been finished.

The flash memory 16 is comprised of a nonvolatile memory and allows reading and writing of data at low speed. The flash memory 16 stores initial operation data and, upon the first feeding of the electric power, outputs the initial operation data to the main memory 17.

The main memory 17 allows reading and writing of data such as the operation data at high speed. Irrespective of whether the electronic device 10 is operated or not, i.e. even if the power feeding to the ACC power supply monitor section 11 through the ACC power supply line 3 is interrupted, the electric power is constantly supplied to the main memory 17 through the backup power supply line 4.

The power interruption processing of the conventional electronic device 10 having the foregoing structure will be explained hereinbelow.

First, when the ACC power supply monitor section 11 detects the interrupted state of the ACC power supply line 3 due to switching-off, engine stop or the like, this detection result is notified to the CPU 15.

Then, the CPU 15 performs the OFF processing to store the operation data into the main memory 17 and, after completion of the OFF processing, notifies the ACC power supply monitor section 11 that the OFF processing has been executed.

Finally, after the notification of the completion of the OFF processing to the ACC power supply monitor section 11, the ACC power supply monitor section 11 controls the respective control switches 12 and 13 to be turned off, thereby to interrupt the power feeding to the CPU 15 and the flash memory 16.

As described above, according to the conventional electronic device 10, even if the power feeding through the ACC power supply line 3 is interrupted, i.e. even if the operation of the electronic device 10 is stopped, the operation data of the electronic device 10 is not deleted so that the operation data at the time of the interruption of the power feeding can be protected. Thus, when the ACC power supply line 3 is energized thereafter to start operations of the respective sections, the electronic device 10 can be restored to the operation state before the interruption of the power feeding.

However, in these days when environment is seriously considered worldwide to advance energy saving, there has been a problem that the conventional vehicle-installed electronic device consumes energy wastefully.

Specifically, in case of the conventional vehicle-installed electronic device, even if the power feeding to the respective sections such as the CPU is interrupted during an engine being stopped, the backup power supply line is constantly connected to the main memory to keep the power feeding for holding the operation data, thus the power feeding to the vehicle-installed electronic device is not interrupted completely.

For solving such a problem, it may be proposed to unify the power supply lines for power feeding to the vehicle-installed electronic device so as to completely interrupt the power feeding during the engine being stopped. However, according to the existing vehicle-installed electronic device, the backup power supply line is connected to the main memory to keep the power feeding to the main memory for holding the operation data, irrespective of energization of the ACC power supply line. Thus, if a structure without the backup power supply line is adopted, there will arise a problem that it is difficult to hold the operation data.

SUMMARY OF THE INVENTION

The present invention has been made in view of the foregoing problems and has an object to provide an electronic device which can back up operation data of the electronic device even when power supply lines for power feeding to the electronic device are unified.

The above object of the present invention can be achieved by an electronic apparatus of the present invention, wherein the electric power is fed thereto from an electric power supply installed in a movable body, and data representing an operation state of the electronic apparatus upon interruption of the power feeding thereto is recorded into a memory device. The electronic apparatus is provided with: an acquiring device for acquiring moving information representing a moving state of the movable body; a predicting device for predicting an occurrence of interruption of the power feeding based on the acquired moving information; and a writing device for writing the data into the memory device when the occurrence of interruption of said power feeding is predicted.

According to this invention, the predicting device predicts the occurrence of interruption of the power feeding based on the acquired moving information, and the writing device writes the data into the memory device when the occurrence of interruption of the power feeding is predicted.

Therefore, since the operation data can be properly stored by predicting the occurrence of interruption of the power feeding, when the electric power is again fed to the electronic apparatus, the operation of the electronic apparatus can be restored without carrying out a bothersome operation such as operation setting for the electronic device.

In one aspect of the present invention, the movable body moves relying on the motive power, and the electric power is fed to the electronic apparatus while the motive power is active; the predicting device predicts stopping of the motive power of the movable body based on the acquired moving information and further predicts the occurrence of interruption of the power feeding by predicting the stopping of the motive power; and the writing device writes the data into the memory device when the stopping of the motive power of the movable body is predicted.

According to this aspect, the predicting device predicts stopping of the motive power of the movable body, and the writing device writes the operation data into the memory device when the stopping of the motive power is predicted.

Therefore, since the operation data can be properly stored by predicting the occurrence of interruption of the power feeding, when the electric power is again fed to the electronic device, the operation of the electronic apparatus can be restored without carrying out a bothersome operation such as operation setting for the electronic apparatus.

In another aspect of the present invention, the moving information includes at least one of stop information, speed information, acceleration information and vibration information of the movable body.

According to this aspect, the stopping of the motive power of the movable body or the power supply interruption can be predicted based on any one of the stop information, the speed information, the acceleration information and the vibration information of the movable body.

In further aspect of the present invention, the moving information is any one of the speed information, the acceleration information and the vibration information and, when a value of the speed information, the acceleration information or the vibration information acquired by the acquiring device is no greater than a predetermined threshold value, the predicting device predicts the occurrence of interruption of the power feeding.

According to this aspect, the predicting device can predict the occurrence of interruption of the power feeding when the value of the speed information, the acceleration information or the vibration information is no greater than the predetermined threshold value.

The above object of the present invention can be achieved by an electronic apparatus of further aspect of the present invention, wherein the electric power is fed thereto from an electric power supply installed in a movable body, and data representing an operation state of the electronic apparatus upon interruption of the power feeding thereto is recorded into a memory device. The electronic apparatus is provided with: a recognizing device for acquiring position information of the movable body to recognize a current position of the movable body; a storing device for storing point information about one or more points registered in advance; a predicting device for predicting an occurrence of interruption of the power feeding when the current position of the movable body is recognized within a preset region from the stored point; and a writing device for writing the data into the memory device when the occurrence of interruption of the power feeding is predicted.

According to this aspect of the present invention, when the current position of the movable body is recognized within the preset region from the point registered in advance, the predicting device predicts the occurrence of interruption of the power feeding, and the writing device writes the data into the memory device.

The probability is high that the movable body is stopped and the interruption of the power feeding to the electronic apparatus is implemented at the registered point.

Therefore, the operation data can be stored by predicting the point where the movable body is stopped and the power feeding is interrupted. Accordingly, the operation data can be properly stored, and thus, when the electric power is again fed to the electronic device, the operation of the electronic device can be restored without carrying out a bothersome operation such as operation setting for the electronic apparatus.

In still further aspect of the present invention, the electronic apparatus performs a route search for the movable body based on information about a destination of the movable body and the recognized current position of the movable body, thereby to set a route to the destination of the movable body; the storing device stores, as the point information, the destination or a stop-by point registered upon setting the route; the predicting device predicts the occurrence of interruption of the power feeding when the current position of the movable body is recognized within the preset region from the stored destination or the stored stand-by point; and the writing device writes the data into the memory device when the occurrence of interruption of the power feeding is predicted.

According to this aspect, the predicting device predicts the occurrence of interruption of the power feeding when the current position of the movable body is recognized within the preset region from the destination or the stand-by point which is set by the route search, and the writing device writes the data into the memory device.

At the destination or the stand-by point, the movable body is stopped and the interruption of the power feeding to the electronic apparatus is implemented.

Therefore, the operation data can be stored by predicting the point where the movable body is stopped and the power feeding is interrupted. Accordingly, the operation data can be properly stored, and thus, when the electric power is again fed to the electronic apparatus, the operation of the electronic apparatus can be restored without carrying out a bothersome operation such as operation setting for the electronic apparatus.

In yet further aspect of the present invention, the electronic apparatus further comprises the memory device comprising a nonvolatile memory.

According to this aspect, the nonvolatile memory is provided, and the writing device writes the data into the nonvolatile memory. Thus, the data can be properly stored when the power supply is interrupted.

The above object of the present invention can be achieved by a data recording method of the present invention in an electronic apparatus, wherein the electric power is fed thereto from an electric power supply installed in a movable body, and data representing an operation state of the electronic apparatus upon interruption of the power feeding thereto is recorded into a memory device. The data recording method of the present invention is provided with: an acquiring process of acquiring moving information of the movable body; a predicting process of predicting an occurrence of interruption of the power feeding based on the acquired moving information; and a writing process of writing the data into the memory device when the occurrence of interruption of the power feeding is predicted.

According to this aspect, the occurrence of interruption of the power feeding is predicted based on the acquired moving information, and the data is written into the memory device when the occurrence of interruption of the power feeding is predicted.

Therefore, since the operation data can be properly stored by predicting the occurrence of interruption of the power feeding, when the electric power is again fed to the electronic apparatus, the operation of the electronic apparatus can be restored without carrying out a bothersome operation such as operation setting for the electronic apparatus.

In one aspect of the present invention, the movable body runs relying on the motive power, and the electric power is fed to the electronic apparatus while the motive power is active; the predicting process predicts stopping of the motive power of the movable body based on the acquired moving information and further predicts the occurrence of interruption of the power feeding by predicting the stopping of the motive power; and the writing process writes said data into the memory device when the predicting process predicts the stopping of the motive power of the movable body.

According to this aspect, the stopping of the motive power of the movable body is predicted, and the operation data is written into the memory device when the stopping of the motive power is predicted.

Therefore, since the operation data can be properly stored by predicting the occurrence of interruption of the power feeding, when the electric power is again fed to the electronic apparatus, the operation of the electronic apparatus can be restored without carrying out a bothersome operation such as operation setting for the electronic apparatus.

In another aspect of the present invention, the moving information includes at least one of stop information, speed information, acceleration information and vibration information of the movable body.

According to this aspect, the stopping of the motive power of the movable body or the power supply interruption can be predicted based on any one of the stop information, the speed information, the acceleration information and the vibration information of the movable body.

The above object of the present invention can be achieved by a data recording method of further aspect of the present invention in an electronic apparatus, wherein the electric power is fed thereto from an electric power supply installed in a movable body, and data representing an operation state of the electronic device upon interruption of the power feeding thereto is recorded into a memory device. The data recording method is provided with: a recognizing process of acquiring position information of the movable body to recognize a current position of the movable body; a predicting process of predicting an occurrence of interruption of the power feeding when the current position of the movable body is recognized within a preset region from point information representing one or more points registered in advance; and a writing process of writing the data into the memory device when the occurrence of interruption of the power feeding is predicted.

According to this aspect of the present invention, when the current position of the movable body is recognized within the preset region from the point registered in advance, the occurrence of interruption of the power feeding is predicted, and the data is written into the memory device.

The probability is high that the movable body is stopped and the interruption of the power feeding to the electronic apparatus is implemented at the registered point.

Therefore, the operation data can be stored by predicting the point where the movable body is stopped and the power feeding is interrupted. Accordingly, the operation data can be properly stored, and thus, when the electric power is again fed to the electronic apparatus, the operation of the electronic apparatus can be restored without carrying out a bothersome operation such as operation setting for the electronic apparatus.

In still further aspect of the present invention, the electronic apparatus performs a route search for the movable body based on information about a destination of the movable body and the recognized current position of the movable body, thereby to set a route to the destination of the movable body; the predicting process predicts the occurrence of interruption of the power feeding when the current position of the movable body is recognized within the preset region from the destination or a stand-by point registered upon setting the route; and the writing process writes the data into the memory device when the occurrence of interruption of the power feeding is predicted.

According to this aspect, the occurrence of interruption of the power feeding is predicted when the current position of the movable body is recognized within the preset region from the destination or the stand-by point which is set by the route search, and the data is written into the memory device.

At the destination or the stand-by point, the movable body is stopped and the interruption of the power feeding to the electronic apparatus is implemented.

Therefore, the operation data can be stored by predicting the point where the movable body is stopped and the power feeding is interrupted. Accordingly, the operation data can be properly stored, and thus, when the electric power is again fed to the electronic apparatus, the operation of the electronic apparatus can be restored without carrying out a bothersome operation such as operation setting for the electronic apparatus.

DESCRIPTION OF THE PREFERRED EMBODIMENTS

Now, preferred embodiments of the present invention will be described hereinbelow with reference to the accompanying drawings. In each of the respective embodiments described hereinbelow, the present invention is applied to a vehicle-installed AV device installed in a desired vehicle.

[First Embodiment]

Figure 1:
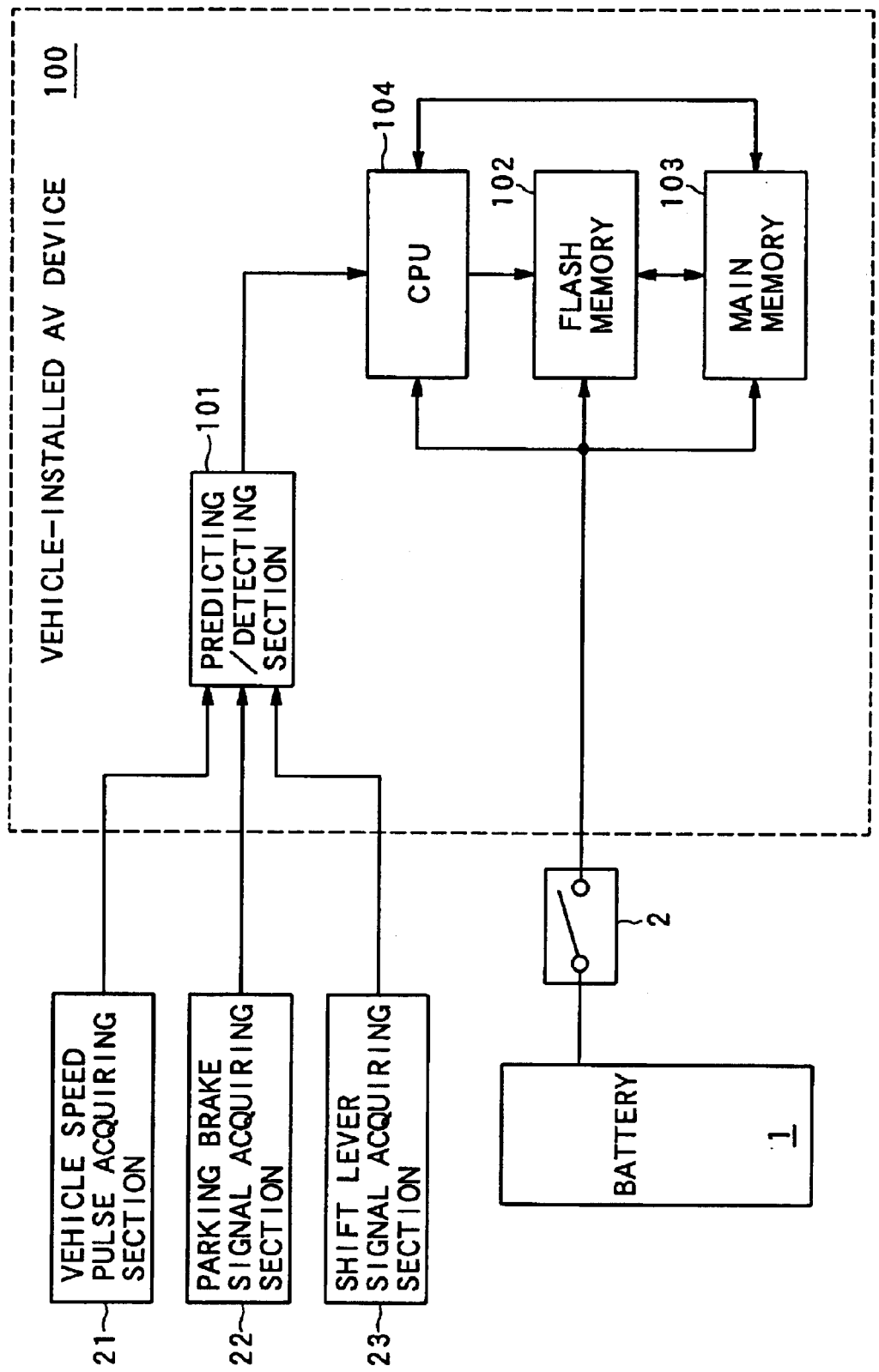
FIG. 1 is a block diagram showing a schematic structure of a vehicle-installed AV device according to a first preferred embodiment of the present invention.
Figure 2:
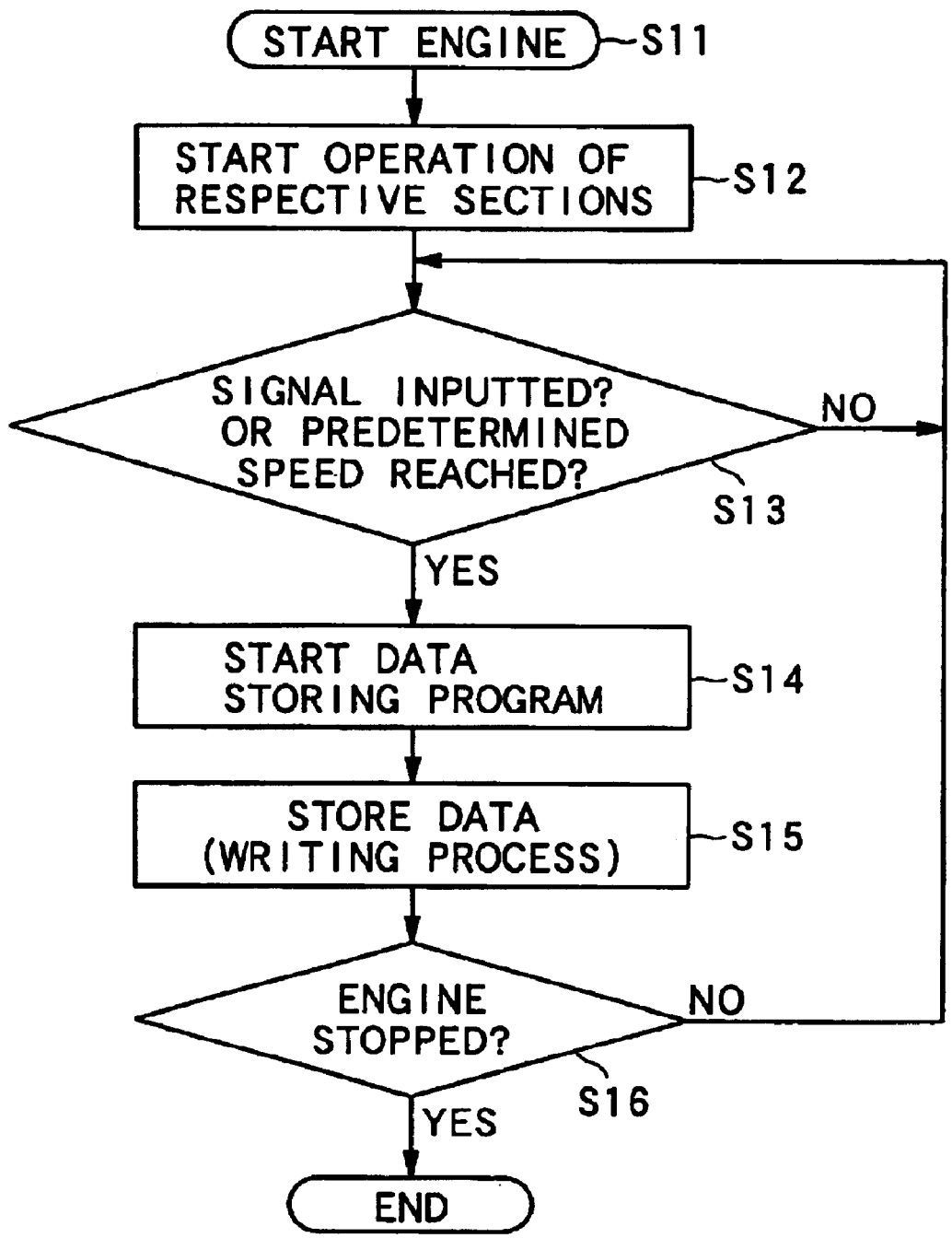
FIG. 2 is a flowchart showing an operation in the vehicle-installed AV device of the first preferred embodiment.

FIGS. 1 and 2 are diagrams showing the first embodiment of an electronic device according to the present invention, wherein the present invention is applied to a vehicle-installed AV device.

First, the overall structure of the vehicle-installed AV device in this embodiment will be described referring to FIG. 1.

FIG. 1 is a block diagram showing a schematic structure of the vehicle-installed AV device according to this embodiment.

According to a vehicle-installed AV device 100 shown in FIG. 1, the electric power is supplied to various sections of the vehicle-installed AV device 100 via a key switch 2 from a battery 1 of a vehicle in which the vehicle-installed AV device 100 is installed (hereinafter simply referred to as "vehicle"). The vehicle-installed AV device 100 is provided with: a predicting/detecting section 101 for detecting moving information representing a running state (moving state) of the vehicle to predict an engine stop; a flash memory 102 and a main memory 103 for recording operation data of the vehicle-installed AV device 100; and a CPU 104 for controlling the flash memory 102, the main memory 103 and other sections (not shown) of the AV device based on a result obtained through an operation of the predicting/detecting section 101.

The respective sections of the vehicle-installed AV device 100, i.e. the flash memory 102, the main memory 103 and the CPU 104, are supplied with the electric power from the battery 1 via the key switch 2. Similarly to the foregoing, the key switch 2 is constituted along with a starter switch for starting an engine and, when an ignition switch or an accessory switch turns to ON state, it feeds the electric power from the battery.

The predicting/detecting section 101 and the CPU 104 constitute an acquiring device and a predicting device according to the present invention, and the flash memory 102 constitutes a memory device according to the present invention.

The predicting/detecting section 101 is connected to a vehicle speed pulse acquiring section 21, a parking brake signal acquiring section 22 and a shift lever signal acquiring section 23. The predicting/detecting section 101 detects pulses detected in the vehicle speed pulse acquiring section 21, detects the presence/absence of respective signals generated in the parking brake signal acquiring section 22 and the shift lever signal acquiring section 23 (moving information), and predicts an engine stop of the vehicle based on results of the detection.

When the parking brake signal or the shift lever signal is inputted or when the vehicle speed reaches a preset value based on the vehicle speed pulses, the predicting/detecting section 101 predicts that an engine of the vehicle will stop, and outputs to the CPU 104 prediction information predicting an engine stop.

The parking brake signal and the shift lever signal constitute stop information of a movable body according to the present invention, and the vehicle speed pulses constitute speed information of the movable body according to the present invention.

The vehicle speed pulse acquiring section 21 acquires vehicle speed pulses outputted from a computer detecting the speed of the vehicle, and outputs the acquired vehicle speed pulses to the predicting/detecting section 101.

Each of the parking brake signal acquiring section 22 and the shift lever signal acquiring section 23 acquires a signal which is produced when a parking brake or a shift lever is used or when the shift lever is set to a predetermined shift position (for example, a parking position), and outputs the acquired signal to the predicting/detecting section 101.

The flash memory 102 is comprised of a nonvolatile memory. In addition to operation data, for example, a basic operation program, of the vehicle-installed AV device 100, the flash memory 102 stores, in case of a CD (Compact Disc) player, order of musical compositions, a time position of a musical composition reproduced upon interruption of the power feeding, and the like, and stores, in case of a navigation device, current position data of a vehicle (hereinafter referred to as "subject vehicle position data"), destination data, data representing a route search result, map data and the like.

The flash memory 102 has a characteristic that stored data does not disappear even if the power feeding is interrupted, while it has a characteristic that reading and writing of data are executed at low speed.

The main memory 103 is comprised of a volatile memory. Like the flash memory 102, in addition to operation data, for example, a basic operation program, of the vehicle-installed AV device 100, the main memory 103 stores, in case of a CD (Compact Disc) player, order of musical compositions, a time position of a musical composition reproduced upon interruption of the power feeding, and the like, and stores, in case of a navigation device, subject vehicle position data, destination data, data representing a route search result, map data and the like.

The main memory 103 has a characteristic that reading and writing of data can be executed at high speed, while it has a characteristic that stored data disappears when the power feeding is interrupted.

Now, an operation of the vehicle-installed AV device 100 will be described referring to FIG. 2.

FIG. 2 is a flowchart showing the operation of the vehicle-installed AV device 100 in this embodiment.

First, when the engine is started, i.e. when the key switch 2 turns on (step S11), the electric power is supplied to the flash memory 102, the main memory 103, the CPU 104 and other sections (not shown), so that the AV function starts to be operated (step S12).

Accordingly, the electric power is supplied to the vehicle-installed AV device 100, and various AV functions are operated based on manipulations of an operating section (not shown) or the like by a driver.

Then, during the vehicle-installed AV device 100 being operated, when the predicting/detecting section 101 detects a parking brake signal or a predetermined shift lever signal, or detects that the speed of the vehicle has reached a predetermined value (acquiring process (step S13)), the predicting/detecting section 101 predicts an engine stop and the CPU 104 starts a data storing program (prediction process (step S14)).

The predicting/detecting section 101 constantly monitors input signals and vehicle speeds.

Then, based on the started data storing program, the operation data stored in the main memory 103 is written into the flash memory 102 (writing process (step S15)).

Finally, when the CPU 104 detects that the engine has been stopped, i.e. the power feeding has been interrupted (step S16), the CPU 104 finishes the AV function to stop the operation of the respective sections.

The CPU 104 monitors an engine stop after the writing process has been executed, and does not stop the operation of the vehicle-installed AV device until the engine is stopped. If the engine is not stopped after the execution of the writing process (step S15) and the predicting/detecting section 101 detects the predetermined input signal or the predetermined vehicle speed (step S13), the prediction process (step S14) and the writing process (step S15) are further executed.

As described above, according to this embodiment, since the speed or stop of the vehicle can be predicted by the predicting/detecting section 101, an occurrence of interruption of the power feeding to the vehicle-installed AV device 100 can be predicted, so that the operation data of the vehicle-installed AV device 100 can be properly stored. Thus, when the electric power is again fed to the vehicle-installed AV device 100, the operation of the vehicle-installed AV device 100 can be restored without carrying out a bothersome operation such as operation setting.

Further, by acquiring the stop information and the speed information of the movable body in the predicting/detecting section 101, the engine stop of the vehicle or the power interruption can be predicted.

Further, the flash memory 102 is constituted of a non-volatile memory and can store the operation data of the vehicle-installed AV device 100 by the CPU 104. Accordingly, the operation data can be properly stored when the electric power is interrupted.

In this embodiment, the flash memory 102 is provided within the vehicle-installed AV device 100. However, the flash memory may be provided outside the vehicle-installed AV device 100. Particularly, it may be arranged that the flash memory is formed portable and loaded into a vehicle-installed AV device having a device for reading from and writing into the flash memory.

Further, in this embodiment, the process may be associated with a navigation operation. Specifically, when the current position of the vehicle is recognized, using a navigation function, within a predetermined region from a point where a possibility of an occurrence of an engine stop is high, a command is fed to the CPU to write the operation data stored in the main memory into the flash memory, thereby to protect the operation data.

For example, it may be arranged that when the current position of the vehicle is recognized within a predetermined region from a position of his/her home, a position of a company or each of other registered points, the operation data starts to be written into the flash memory, or it may be arranged that a result of a route search performed based on destination information and a start position of the vehicle is used and, when the current position of the vehicle is recognized within a predetermined region from each of set stop-by points or a destination, a command is fed to the CPU to write the operation data stored in the main memory into the flash memory, thereby to protect the operation data.

In this embodiment, the electric power is supplied to the CPU 104, the flash memory 102 and the main memory 103 from the battery 1 via the key switch 2. On the other hand, as shown in FIG. 3, the electric power may be supplied to the CPU 104, the flash memory 102 and the main memory 103 through a power supply line 6 from a cigar socket 5 connected to the battery 1 via the key switch 2.

Figure 3:
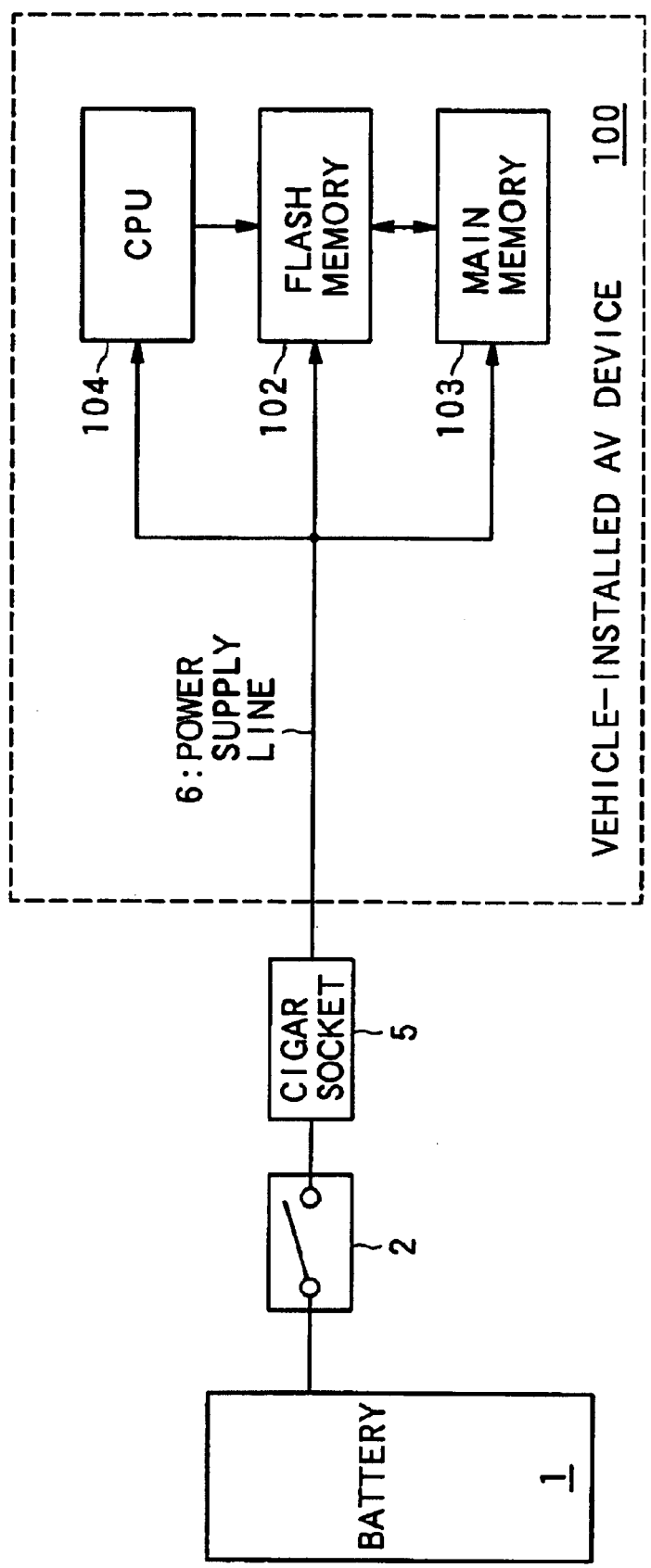
FIG. 3 is a diagram showing a structure of a part of a power supply system wherein power feeding in the first preferred embodiment is carried out from a cigar socket.

FIG. 3 is a diagram showing a structure of a part of a power supply system wherein the power feeding in this embodiment is carried out from the cigar socket.

[Second Embodiment]

Figure 4:
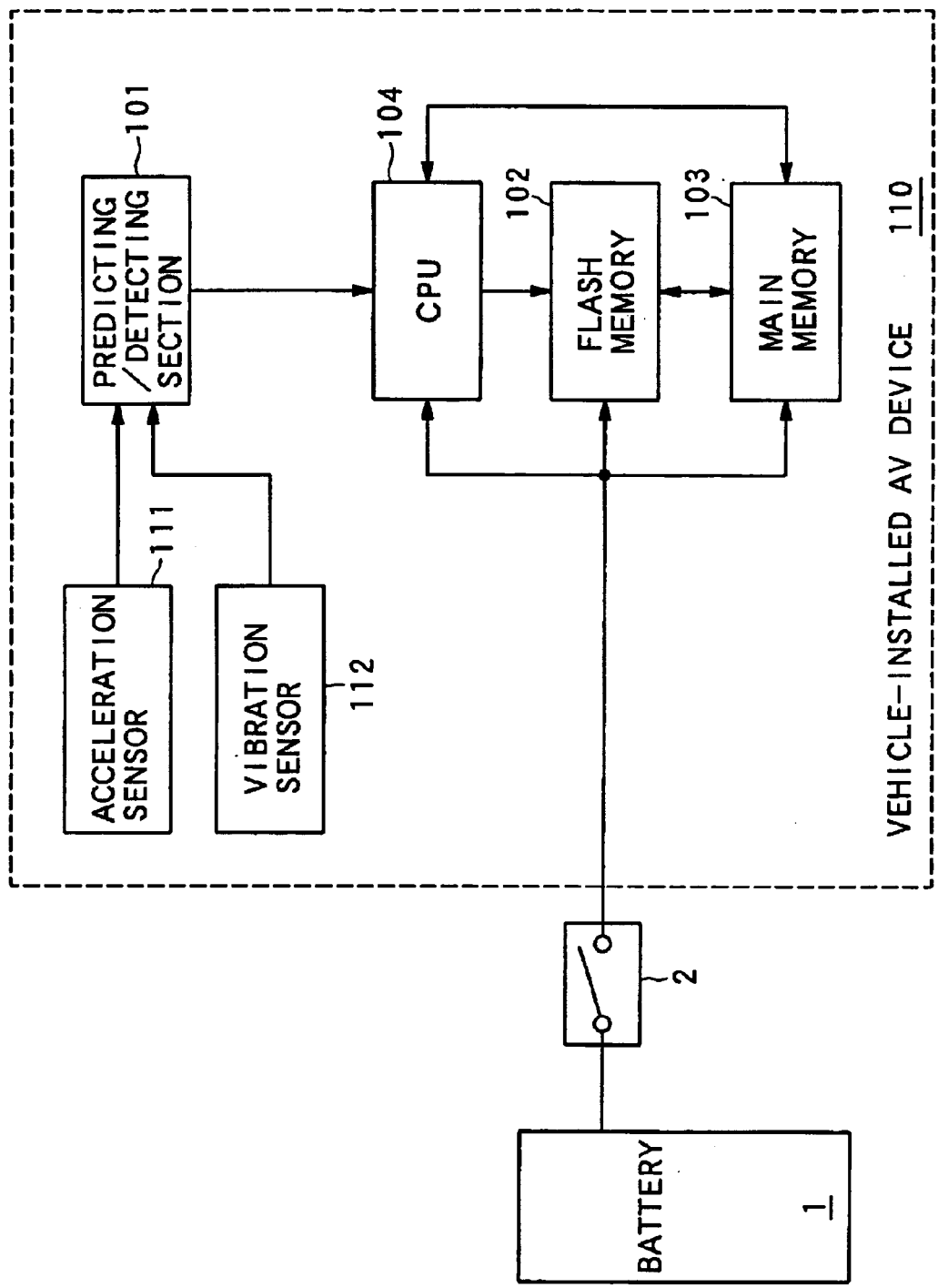
FIG. 4 is a block diagram showing a schematic structure of a vehicle-installed AV device according to a second preferred embodiment of the present invention.
Figure 5:
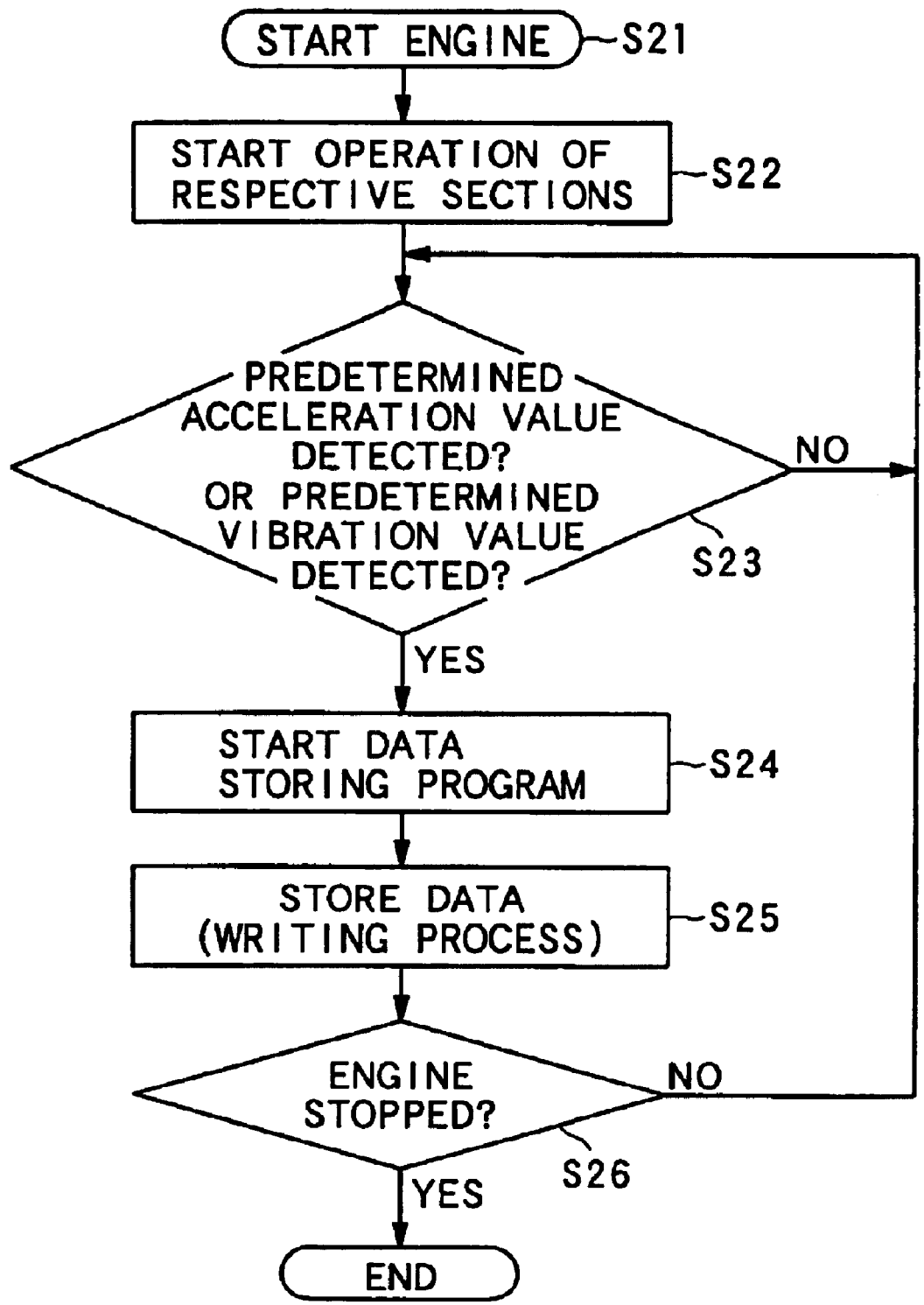
FIG. 5 is a flowchart showing an operation in the vehicle-installed AV device of the second preferred embodiment.

FIGS. 4 and 5 are diagrams showing the second embodiment of an electronic device (vehicle-installed AV device) according to the present invention. In this embodiment, instead of predicting an engine stop of the vehicle based on pulses or a signal inputted from the vehicle speed pulse acquiring section, the parking brake signal acquiring section or the shift lever signal acquiring section as in the first embodiment, the feature resides in that an acceleration sensor and a vibration sensor are provided in the vehicle-installed AV device and an engine stop of the vehicle is predicted based on acceleration or vibration of the vehicle. Since the other structure is the same as the first embodiment, explanation thereof is omitted by assigning the same reference numerals to the same members.

First, the overall structure of the vehicle-installed AV device in this embodiment will be described referring to FIG. 4.

FIG. 4 is a block diagram showing a schematic structure of the vehicle-installed AV device according to this embodiment.

According to a vehicle-installed AV device 110 shown in FIG. 4, the electric power is supplied to various sections of the vehicle-installed AV device 110 via the key switch 2 from the battery 1 of the vehicle. The vehicle-installed AV device 110 is provided with: an acceleration sensor 111 for detecting acceleration of the vehicle; a vibration sensor 112 for detecting vibration of the vehicle; a predicting/detecting section 101 for detecting moving information representing a running state (moving state) of the vehicle based on the acceleration or the vibration detected by the acceleration sensor 111 or the vibration sensor 112 thereby to predict an engine stop; a flash memory 102 and a main memory 103 for recording operation data of the vehicle-installed AV device 110; and a CPU 104 for controlling the flash memory 102, the main memory 103 and other sections (not shown) of the AV device based on a result obtained through an operation of the predicting/detecting section 101.

The acceleration sensor 111 or the vibration sensor 112 constitutes an acquiring device according to the present invention.

The acceleration sensor 111 senses acceleration in vehicle running, converts the sensed acceleration into acceleration data in the form of pulses or voltages and outputs it to the predicting/detecting section 101.

The vibration sensor 112 senses vibration in vehicle running, converts the sensed vibration into vibration data in the form of pulses or voltages and outputs it to the predicting/detecting section 101.

The predicting/detecting section 101 is inputted with the acceleration data and the vibration data. The predicting/detecting section 101 detects whether each of the inputted acceleration data and vibration data is equal to a preset value and, when the preset value is detected, it predicts an engine stop of the vehicle and outputs this prediction information to the CPU 104.

For example, when the acceleration data is inputted, the predicting/detecting section 101 detects large deceleration or stopping of the vehicle based on the acceleration data. Upon detection of the large deceleration or stopping of the vehicle, the predicting/detecting section 101 outputs to the CPU 104 prediction information that the engine of the vehicle will stop.

On the other hand, when the vibration data is inputted, the predicting/detecting section 101 detects small vibration of the vehicle, i.e. large deceleration of the vehicle. Upon detection of a vibration value representing the small vibration, the predicting/detecting section 101 outputs to the CPU 104 prediction information that the engine of the vehicle will stop.

The acceleration data and the vibration data constitute acceleration information and vibration information of the movable body according to the present invention, respectively.

The CPU 104 is connected to the predicting/detecting section 101. Like in the first embodiment, when the prediction information of the engine stop is inputted, the CPU 104 controls the flash memory 102 and the main memory 103 to protect the operation data upon interruption of the power feeding.

Now, an operation of the vehicle-installed AV device 110 will be described referring to FIG. 5.

FIG. 5 is a flowchart showing the operation of the vehicle-installed AV device 110 in this embodiment.

First, when the engine is started, i.e. when the key switch 2 turns on (step S21), the electric power is supplied to the flash memory 102, the main memory 103, the CPU 104 and other sections (not shown), so that the AV function starts to be operated (step S22).

Accordingly, the electric power is supplied to the vehicle-installed AV device 110, and various AV functions are operated based on manipulations of an operating section (not shown) or the like by a driver.

Then, during the vehicle-installed AV device 110 being operated, when the predicting/detecting section 101 detects a predetermined acceleration value or a predetermined vibration value of the vehicle based on the acceleration data or the vibration data from the acceleration sensor 111 or the vibration sensor 112 (acquiring process (step S23)), the predicting/detecting section 101 predicts an engine stop and the CPU 104 starts a data storing program (prediction process (step S24)).

The predicting/detecting section 101 constantly monitors acceleration and vibration of the vehicle based on the acceleration data and the vibration data inputted from the acceleration sensor 111 and the vibration sensor 112.

Then, based on the started data storing program, the operation data stored in the main memory 103 is written into the flash memory 102 (writing process (step S25)).

Finally, when the CPU 104 detects that the engine has been stopped, i.e. the power feeding has been interrupted (step S26), the CPU 104 finishes the AV function to stop the operation of the respective sections.

The CPU 104 monitors an engine stop after the writing process has been executed, and does not stop the operation of the vehicle-installed AV device 110 until the engine is stopped. If the engine is not stopped after the execution of the writing process (step S25) and the predicting/detecting section 101 detects the predetermined acceleration value or the predetermined vibration value (step S23), the prediction process (step S24) and the writing process (step S25) are further executed.

As described above, according to this embodiment, since the acceleration or stop of the vehicle can be predicted by the predicting/detecting section 101, an occurrence of interruption of the power feeding to the vehicle-installed AV device 110 can be predicted, so that the operation data of the vehicle-installed AV device 110 can be properly stored. Thus, when the electric power is again fed to the vehicle-installed AV device 110, the operation of the vehicle-installed AV device 110 can be restored without carrying out a bothersome operation such as operation setting.

Further, by acquiring the acceleration information and the vibration information of the movable body from the acceleration sensor 111 and the vibration sensor 112, the engine stop of the vehicle or the power interruption can be predicted.

Further, the flash memory 102 is constituted of a non-volatile memory and can store the operation data of the vehicle-installed AV device 110 by the CPU 104. Accordingly, the operation data can be properly stored when the electric power is interrupted.

In this embodiment, the flash memory 102 is provided within the vehicle-installed AV device 110. However, the flash memory may be provided outside the vehicle-installed AV device 110. Particularly, it may be arranged that the flash memory is formed portable and loaded into a vehicle-installed AV device having a device for reading from and writing into the flash memory.

Further, in this embodiment, the process may be associated with a navigation operation. Specifically, when the current position of the vehicle is recognized, using a navigation function, within a predetermined region from a point where a possibility of an occurrence of an engine stop is high, a command is fed to the CPU to write the operation data stored in the main memory into the flash memory, thereby to protect the operation data.

For example, it may be arranged that when the current position of the vehicle is recognized within a predetermined region from a position of his/her home, a position of a company or each of other registered points, the operation data starts to be written into the flash memory, or it may be arranged that a result of a route search performed based on destination information and a start position of the vehicle is used and, when the current position of the vehicle is recognized within a predetermined region from each of set stop-by points or a destination, a command is fed to the CPU to write the operation data stored in the main memory into the flash memory, thereby to protect the operation data.

In this embodiment, like in the first embodiment, the electric power is supplied to the CPU 104, the flash memory 102 and the main memory 103 from the battery 1 via the key switch 2. On the other hand, as shown in FIG. 3, the electric power may be supplied to the CPU 104, the flash memory 102 and the main memory 103 through the power supply line 6 from the cigar socket 5 connected to the battery 1 via the key switch 2.

[Third Embodiment]

Figure 6:
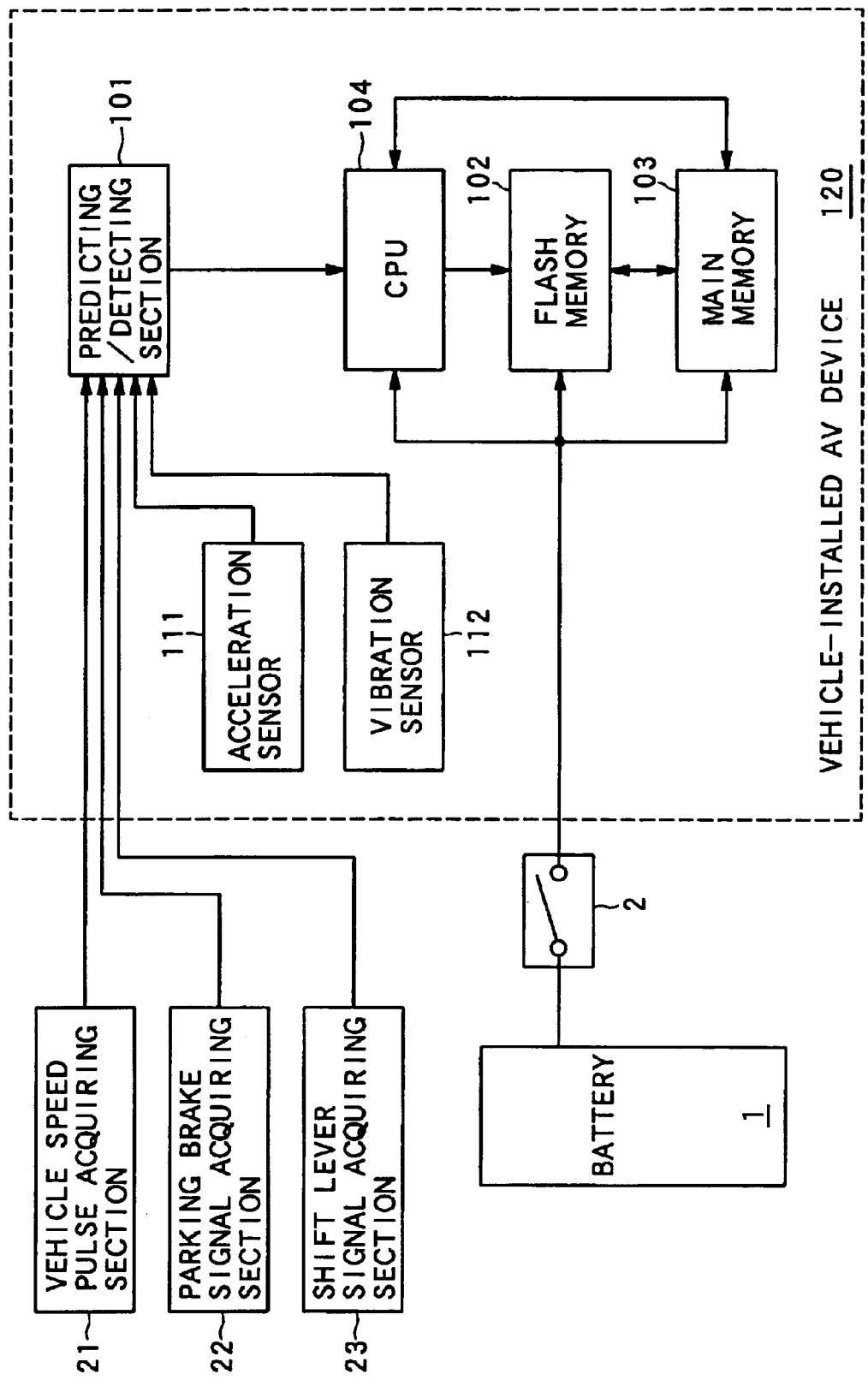
FIG. 6 is a block diagram showing a schematic structure of a vehicle-installed AV device according to a third preferred embodiment of the present invention.
Figure 7:
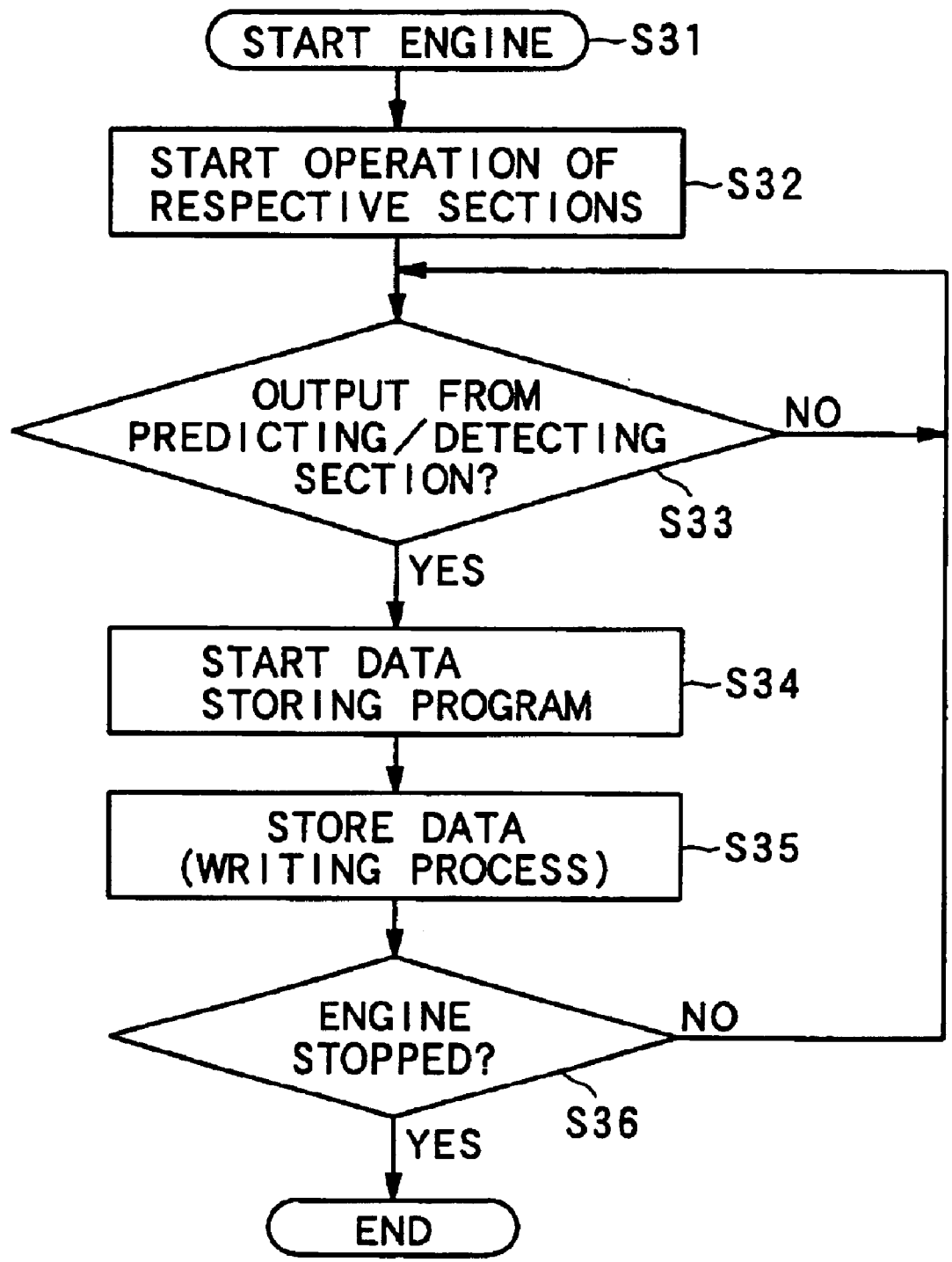
FIG. 7 is a flowchart showing an operation in the vehicle-installed AV device of the third preferred embodiment.

FIGS. 6 and 7 are diagrams showing the third embodiment of an electronic device (vehicle-installed AV device) according to the present invention. In this embodiment, the feature resides in that the acceleration sensor and the vibration sensor used in the second embodiment are provided in the vehicle-installed AV device in the first embodiment, and the predicting/detecting section is provided with, in addition to the function of predicting an engine stop of the vehicle based on pulses or a signal inputted from the vehicle speed pulse acquiring section, the parking brake signal acquiring section or the shift lever signal acquiring section, the function of predicting an engine stop of the vehicle based on the acceleration data or the vibration data. Since the other structure is the same as the first and second embodiments, explanation thereof is omitted by assigning the same reference numerals to the same members.

First, the overall structure of the vehicle-installed AV device in this embodiment will be described referring to FIG. 6.

FIG. 6 is a block diagram showing a schematic structure of the vehicle-installed AV device according to this embodiment.

According to a vehicle-installed AV device 120 shown in FIG. 6, the electric power is supplied to various sections of the vehicle-installed AV device 120 via the key switch 2 from the battery 1 of the vehicle. The vehicle-installed AV device 120 is provided with: a predicting/detecting section 101 for detecting a running state of the vehicle thereby to predict an engine stop; a flash memory 102 and a main memory 103 for recording operation data of the vehicle-installed AV device 120; a CPU 104 for controlling the flash memory 102, the main memory 103 and other sections (not shown) of the AV device based on a result obtained through an operation of the predicting/detecting section 101; an acceleration sensor 111 for detecting acceleration of the vehicle; and a vibration sensor 112 for detecting vibration of the vehicle.

The predicting/detecting section 101 is connected to the vehicle speed pulse acquiring section 21, the parking brake signal acquiring section 22, the shift lever signal acquiring section 23, the acceleration sensor 111 and the vibration sensor 112, and inputs signals or information outputted from the vehicle speed pulse acquiring section 21, the parking brake signal acquiring section 22, the shift lever signal acquiring section 23, the acceleration sensor 111 and the vibration sensor 112. When prediction information is derived based on the inputted signal or information, the predicting/detecting section 101 outputs it to the CPU 104.

Specifically, when the parking brake signal or the shift lever signal is detected, when the vehicle speed reaches a preset value, or when the acceleration or the vibration of the vehicle reaches a preset value, the predicting/detecting section 101 outputs to the CPU 104 prediction information predicting an engine stop, i.e. information that an engine stop will occur. Accordingly, the predicting/detecting section 101 outputs the prediction information to the CPU 104 when any one of the parking brake signal, the shift lever signal, the preset speed value, the preset acceleration value and the preset vibration value is detected.

It may also be arranged that the predicting/detecting section 101 is comprised of a logical product (AND) circuit and a logical sum (OR) circuit and, when any two or three of the parking brake signal, the shift lever signal, the preset speed value, the preset acceleration value and the preset vibration value are detected, it outputs to the CPU 104 prediction information predicting an engine stop, thereby to improve the likelihood of the engine stop prediction.

The CPU 104 is connected to the predicting/detecting section 101. Like in the first and second embodiments, when the prediction information of the engine stop is inputted, the CPU 104 controls the flash memory 102 and the main memory 103 to protect the operation data upon interruption of the power feeding.

Now, an operation of the vehicle-installed AV device 120 will be described referring to FIG. 7.

FIG. 7 is a flowchart showing the operation of the vehicle-installed AV device 120 in this embodiment.

First, when the engine is started, i.e. when the key switch 2 turns on (step S31), the electric power is supplied to the flash memory 102, the main memory 103, the CPU 104 and other sections (not shown), so that the AV function starts to be operated (step S32).

Accordingly, the electric power is supplied to the vehicle-installed AV device 120, and various AV functions are operated based on manipulations of an operating section (not shown) or the like by a driver.

Then, during the vehicle-installed AV device 120 being operated, when the predicting/detecting section 101 detects the predetermined signal from the parking brake signal acquiring section 22 or the shift lever signal acquiring section 23, the predetermined speed of the vehicle based on the pulses from the vehicle speed pulse acquiring section 21, the predetermined acceleration value of the vehicle based on the acceleration data from the acceleration sensor 111 or the predetermined vibration value of the vehicle based on the vibration data from the vibration sensor 112 (acquiring process (step S33)), the predicting/detecting section 101 predicts an engine stop and the CPU 104 starts a data storing program (prediction process (step S34)).

The predicting/detecting section 101 constantly monitors the presence/absence of an input signal, speed, acceleration and vibration of the vehicle by use of the acceleration sensor 111 and the vibration sensor 112.

Then, based on the started data storing program, the operation data stored in the main memory 103 is written into the flash memory 102 (writing process (step S35)).

Finally, when the CPU 104 detects that the engine has been stopped, i.e. the power feeding has been interrupted (step S36), the CPU 104 finishes the AV function to stop the operation of the respective sections.

The CPU 104 monitors an engine stop after the writing process has been executed, and does not stop the operation of the vehicle-installed AV device 120 until the engine is stopped. If the engine is not stopped after the execution of the writing process (step S35) and the predicting/detecting section 101 detects the predetermined input signal, the predetermined vehicle speed, the predetermined acceleration value or the predetermined vibration value (step S33), the prediction process (step S34) and the writing process (step S35) are further executed.

As described above, according to this embodiment, since the speed, acceleration or stop of the vehicle can be predicted by the predicting/detecting section 101 and the likelihood of the prediction can be improved, an occurrence of interruption of the power feeding to the vehicle-installed AV device 120 can be predicted, so that the operation data of the vehicle-installed AV device 120 can be properly stored. Thus, when the electric power is again fed to the vehicle-installed AV device 120, the operation of the vehicle-installed AV device 120 can be restored without carrying out a bothersome operation such as operation setting.

Further, by acquiring the stop information, the speed information, the acceleration information and the vibration information of the movable body through the predicting/detecting section 101, the acceleration sensor 111 and the vibration sensor 112, the engine stop of the vehicle or the power interruption can be predicted.

Further, the flash memory 102 is constituted of a non-volatile memory and can store the operation data of the vehicle-installed AV device 120 by the CPU 104. Accordingly, the operation data can be properly stored when the electric power is interrupted.

In this embodiment, the flash memory 102 is provided within the vehicle-installed AV device 120. However, the flash memory may be provided outside the vehicle-installed AV device 120. Particularly, it may be arranged that the flash memory is formed portable and loaded into a vehicle-installed AV device having a device for reading from and writing into the flash memory.

Further, in this embodiment, the process may be associated with a navigation operation. Specifically, when the current position of the vehicle is recognized, using a navigation function, within a predetermined region from a point where a possibility of an occurrence of an engine stop is high, a command is fed to the CPU to write the operation data stored in the main memory into the flash memory, thereby to protect the operation data.

For example, it may be arranged that when the current position of the vehicle is recognized within a predetermined region from a position of his/her home, a position of a company or each of other registered points, the operation data starts to be written into the flash memory, or it may be arranged that a result of a route search performed based on destination information and a start position of the vehicle is used and, when the current position of the vehicle is recognized within a predetermined region from each of set stop-by points or a destination, a command is fed to the CPU to write the operation data stored in the main memory into the flash memory, thereby to protect the operation data.

In this embodiment, like in the first embodiment, the electric power is supplied to the CPU 104, the flash memory 102 and the main memory 103 from the battery 1 via the key switch 2. On the other hand, as shown in FIG. 3, the electric power may be supplied to the CPU 104, the flash memory 102 and the main memory 103 through the power supply line 6 from the cigar socket 5 connected to the battery 1 via the key switch 2.

[Fourth Embodiment]

Figure 8:
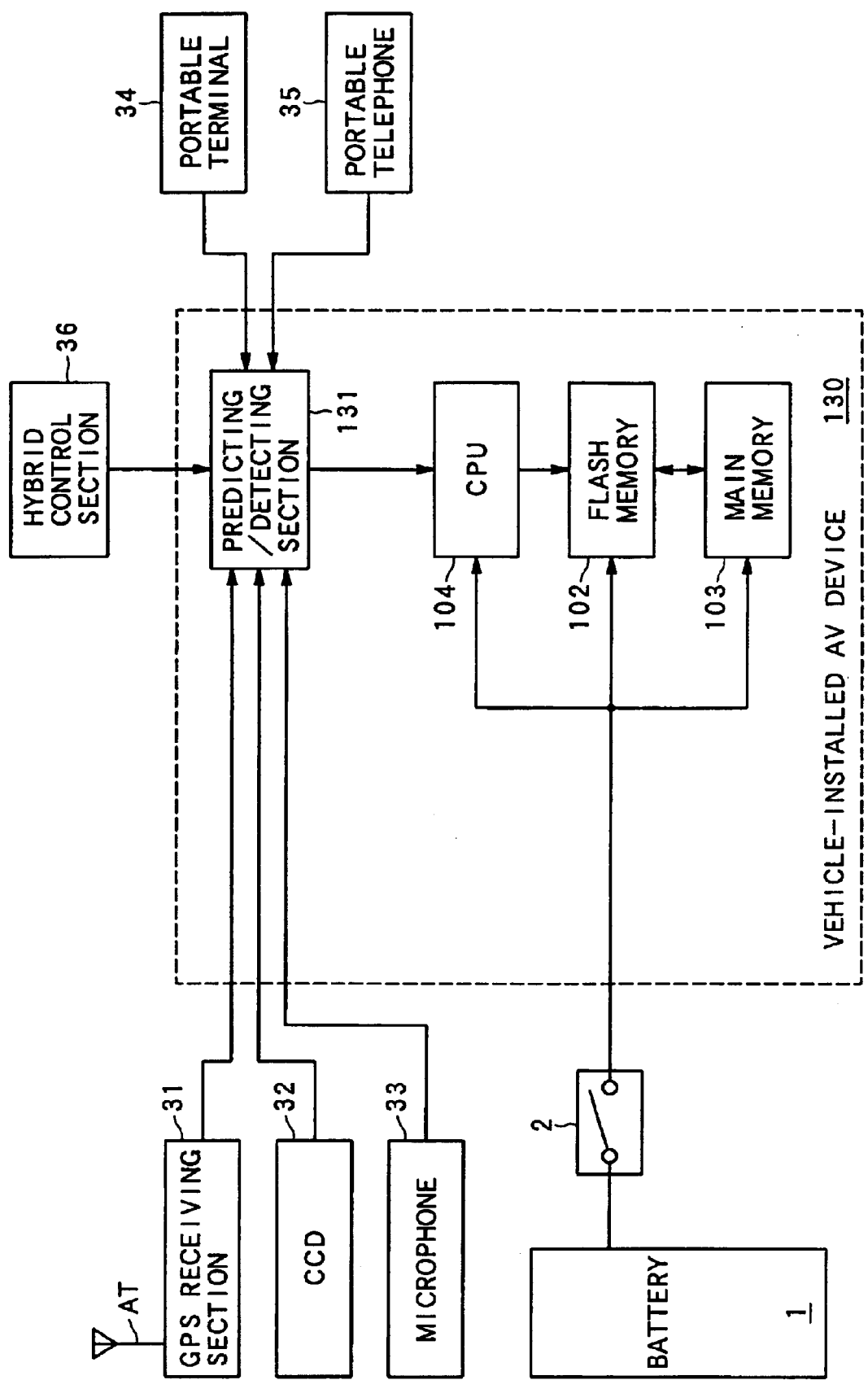
FIG. 8 is a block diagram showing a schematic structure of a vehicle-installed AV device according to a fourth preferred embodiment of the present invention.
Figure 9:
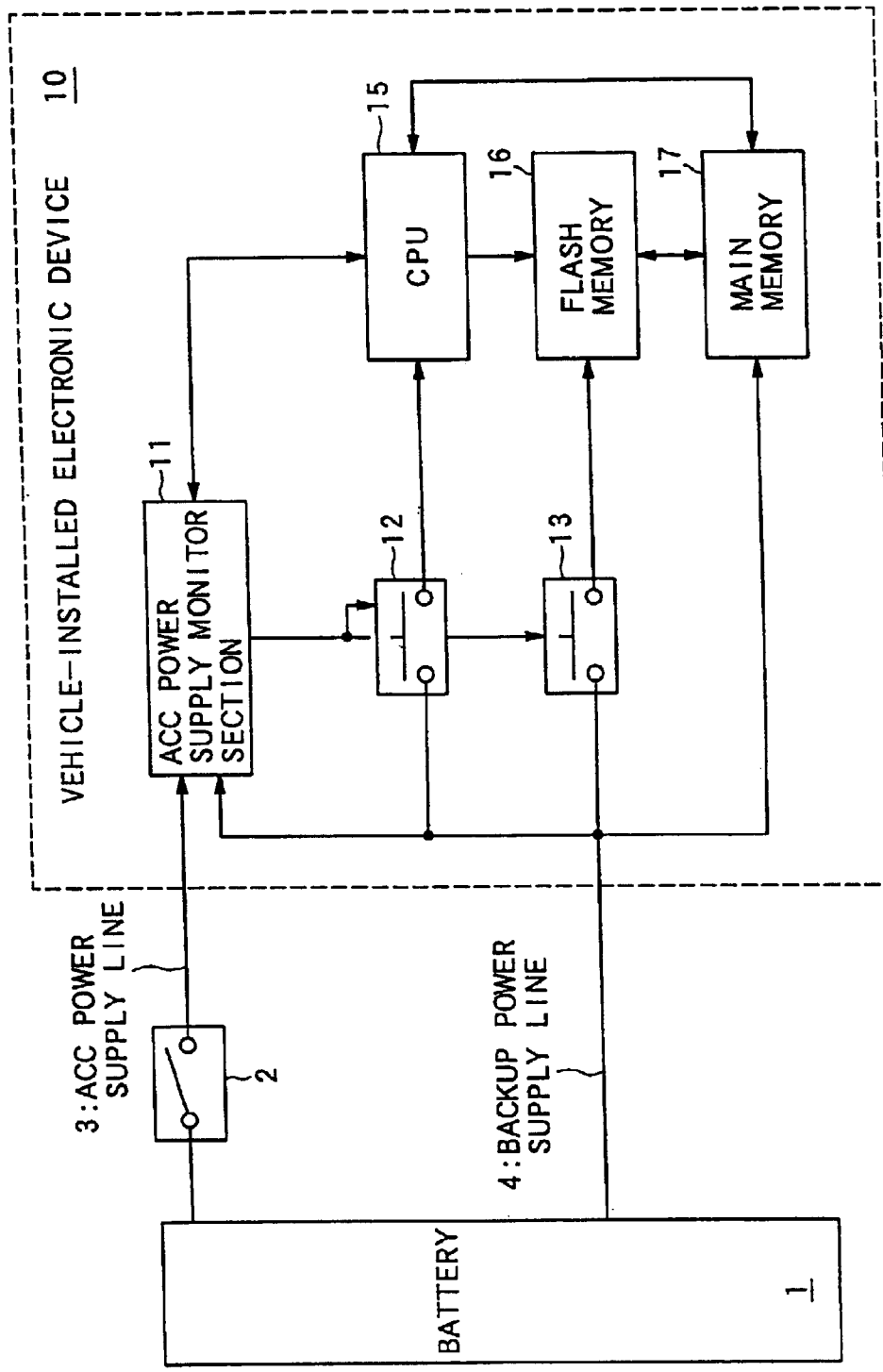
FIG. 9 is a block diagram showing a schematic structure relating to power supplies for a conventional electronic device.

FIG. 8 is a diagram showing the fourth embodiment of an electronic device (vehicle-installed AV device) according to the present invention. In this embodiment, instead of predicting an engine stop of the vehicle based on pulses or a signal inputted from the vehicle speed pulse acquiring section, the parking brake signal acquiring section or the shift lever signal acquiring section or based on acceleration data or vibration data as in the third embodiment, the feature resides in that an engine stop of the vehicle is predicted based on position data of the vehicle, image data outside the vehicle, road noise or a hybrid control. Since the other structure is the same as the third embodiment, explanation thereof is omitted by assigning the same reference numerals to the same members.

The hybrid control represents a motive power control in an automobile (vehicle) which runs using a plurality of motive power sources. In this embodiment, the hybrid control controls an internal combustion mechanism (engine) which is used in a normal automobile and obtains a driving force by burning a fuel inside, and an electric motor which obtains a driving force by the electric power charged in a battery installed in an automobile. A later-described hybrid control section executes a motive power control of the internal combustion mechanism and the electric motor.

First, the overall structure of the vehicle-installed AV device in this embodiment will be described referring to FIG. 8.

FIG. 8 is a block diagram showing a schematic structure of the vehicle-installed AV device according to this embodiment.

According to a vehicle-installed AV device 130 shown in FIG. 8, the electric power is supplied to various sections of the vehicle-installed AV device 130 via the key switch 2 from the battery 1 of the vehicle. The vehicle-installed AV device 130 is provided with: a predicting/detecting section 131 for detecting a running state of the vehicle thereby to predict an engine stop; a flash memory 102 and a main memory 103 for recording operation data of the vehicle-installed AV device 130; and a CPU 104 for controlling the flash memory 102, the main memory 103 and other sections (not shown) of the AV device based on a result obtained through an operation of the predicting/detecting section 131.

To the predicting/detecting section 131 inputs predetermined data from a GPS (Global Positioning System) receiving section 31, an image pickup element (hereinafter referred to as "CCD (Charge Coupled Device) 32, a microphone 33, a portable terminal 34, a portable telephone 35 and a hybrid control section 36. Based on the inputted predetermined data, the predicting/detecting section 131 predicts an engine stop of the vehicle and outputs to the CPU 104 prediction information predicting the engine stop.

(1) GPS Data

The predicting/detecting section 131 acquires GPS data outputted from the GPS receiving section 31 and, based on the GPS data, predicts a stopped state of the vehicle, i.e. stopping of the engine.

The GPS receiving section 31 acquires the GPS data of the vehicle via an antenna AT. Based on the GPS data, the predicting/detecting section 131 judges a running state of the vehicle, i.e. whether the vehicle is stopped or running.

Since the GPS data is measured positional data of the vehicle, current position data of the vehicle can be obtained by receiving the GPS data. The GPS receiving section 31 normally receives the GPS data per interval of 200 ms.

When the vehicle is stopped, the obtained vehicle position data indicates the same position (approximately the same position) plural times. Accordingly, based on the GPS data, it can be judged that the vehicle is stopped.

In this embodiment, when the predicting/detecting section 131 detects that the obtained position data of the vehicle have agreed with each other a predetermined number of times, it outputs to the CPU 104 prediction information that the engine will stop.

(2) Vehicle Position Data

The predicting/detecting section 131 acquires GPS data and current position information of the vehicle outputted from the portable terminal 34 equipped with a GPS receiving system and the portable telephone 35 having an acquiring device for acquiring position information and, based on the acquired GPS data or current position information, it predicts a stopped state of the vehicle, i.e. stopping of the engine.

The portable terminal 34 equipped with the GPS receiving system is located at a position where the vehicle is also located. Thus, the GPS data obtained by the portable terminal 34 can be regarded as GPS data of the vehicle. Accordingly, since the GPS data of the vehicle can be obtained by receiving the GPS data acquired by the portable terminal 34, the position data of the vehicle can be obtained like in the foregoing.

In this embodiment, the portable terminal 34 and the vehicle-installed AV device 130 are connected to each other so that the predicting/detecting section 131 acquires the GPS data per predetermined interval and, when the predicting/detecting section 131 detects that the acquired position data of the vehicle have agreed with each other a predetermined number of times, it outputs to the CPU 104 prediction information that the engine will stop.

The portable telephone 35 can communicate with a plurality of base stations (not shown) via a public telephone network line and, using the three-point position measuring technique, it can recognize its own position through communications with the plurality of base stations, i.e. current position information of the portable telephone 35 can be obtained.

Therefore, in this embodiment, the portable telephone 35 and the vehicle-installed AV device 130 are connected to each other so that the predicting/detecting section 131 acquires the current position information, i.e. the vehicle position data, per predetermined interval and, when the predicting/detecting section 131 detects that the acquired position data of the vehicle have agreed with each other a predetermined number of times, it outputs to the CPU 104 prediction information that the engine will stop. With this arrangement, the effect similar to the foregoing can be obtained.

(3) Vehicle Outside Image Data

The predicting/detecting section 131 acquires image data outputted from the CCD 32, and detects the degree of correlation with image data acquired last time. When the predicting/detecting section 131 judges that the degree of correlation is high, it predicts a stopped state of the vehicle, i.e. stopping of the engine.

For example, the small CCD 32 is disposed in the vehicle on a sidewalk side thereof, a landscape outside the vehicle is acquired by the CCD 32 at every second, the acquired image data is outputted to the predicting/detecting section 131, and the outputted image data is inputted to the predicting/detecting section 131.

The predicting/detecting section 131 compares characteristic amounts of the acquired image data and the last image data (one second prior image data) and, when the characteristic amounts agree with each other, it judges that the degree of correlation is high. When the predicting/detecting section 131 judges that the degrees of correlation have been high continuously a predetermined number of times, it predicts a stopped state of the vehicle, i.e. stopping of the engine.

For example, in this embodiment, a color average value is calculated per image data, and this color average value is extracted as a characteristic amount of the image data. Particularly, in this embodiment, since the high speed processing is carried out, a color average value of a portion at the center of image data is calculated per image data.

(4) Road Noise

The predicting/detecting section 131 acquires noise (road noise) acquired by the microphone 33. When the predicting/detecting section 131 judges that a sound level of the acquired noise is no greater than a predetermined level, it predicts a stopped state of the vehicle, i.e. stopping of the engine.

In general, when the vehicle is running, a frictional sound between tires and a road, i.e. the road noise, is generated, and hence, the noise level differs between the running state and the stopped state of the vehicle.

Therefore, by actually measuring noise levels in the running and stopped states of the vehicle and setting a threshold value to be used for the judgment based on the measured data in a vehicle maker or the like, the stopped state of the vehicle can be predicted based on the levels of the road noise.

In this embodiment, when the noise level acquired by the microphone 33 becomes no greater than a predetermined value, the predicting/detecting section 131 outputs to the CPU 104 prediction information that the engine will stop.

(5) Hybrid Control

When switching from the engine to the electric motor occurs, a predetermined signal is inputted to the predicting/detecting section 131 from the hybrid control section 36. When this signal is inputted, the predicting/detecting section 131 predicts a stopped state of the vehicle, i.e. stopping of the engine.

Generally, in an automobile (vehicle) in which the hybrid control is executed, when the automobile speed is lowered, the engine is stopped and the automobile is driven by the electric motor. Specifically, the automobile executing the hybrid control has a feature in that the vehicle is driven by the electric motor during the vehicle low speeds to lower the fuel consumption.

Therefore, when the motive power is switched from the engine to the electric motor, it can be judged that the vehicle reaches a low speed. When the vehicle reaches the low speed, the probability becomes high that the vehicle will stop. Accordingly, based on the signal outputted from the hybrid control section 36 upon switching from the engine to the electric motor, the predicting/detecting section 131 predicts a stopped state of the vehicle, i.e. stopping of the engine.

As described above, when the vehicle is judged to be stopped based on the position information, the degree of correlation of image data or the noise level outside the vehicle, or the hybrid control signal is inputted, the predicting/detecting section 131 outputs to the CPU 104 the prediction information predicting the engine stop, i.e. the information that the engine will stop.

An operation in this embodiment, i.e. an operation from power ON to power OFF, is the same as that of the third embodiment except that the signals as bases for predicting the engine stop and the judgment criterion data differ from those in the third embodiment, and thus, explanation thereof is omitted.

As described above, according to this embodiment, since stopping of the vehicle can be predicted by the predicting/detecting section 131, an occurrence of interruption of the power feeding to the vehicle-installed AV device 130 can be predicted, so that the operation data of the vehicle-installed AV device 130 can be properly stored. Thus, when the electric power is again fed to the vehicle-installed AV device 130, the operation of the vehicle-installed AV device 130 can be restored without carrying out a bothersome operation such as operation setting.

Further, the flash memory 102 is constituted of a nonvolatile memory and can store the operation data of the vehicle-installed AV device 130 by the CPU 104. Accordingly, the operation data can be properly stored when the electric power is interrupted.

In this embodiment, the flash memory 102 is provided within the vehicle-installed AV device 130. However, the flash memory may be provided outside the vehicle-installed AV device 130. Particularly, it may be arranged that the flash memory is formed portable and loaded into a vehicle-installed AV device having a device for reading from and writing into the flash memory.

Further, in this embodiment, the process may be associated with a navigation operation. Specifically, when the current position of the vehicle is recognized, using a navigation function, within a predetermined region from a point where a possibility of an occurrence of an engine stop is high, a command is fed to the CPU to write the operation data stored in the main memory into the flash memory, thereby to protect the operation data.

For example, it may be arranged that when the current position of the vehicle is recognized within a predetermined region from a position of his/her home, a position of a company or each of other registered points, the operation data starts to be written into the flash memory, or it may be arranged that a result of a route search performed based on destination information and a start position of the vehicle is used and, when the current position of the vehicle is recognized within a predetermined region from each of set stop-by points or a destination, a command is fed to the CPU to write the operation data stored in the main memory into the flash memory, thereby to protect the operation data.

Like in the third embodiment, it may also be arranged that the predicting/detecting section 131 is comprised of a logical product (AND) circuit and a logical sum (OR) circuit and, when any two or three of the judgment of the vehicle to be stopped based on the vehicle position information, the judgment of the vehicle to be stopped based on the degree of correlation of image data, the judgment of the vehicle to be stopped based on the noise level outside the vehicle, and the input of the hybrid control signal occur, it outputs to the CPU 104 prediction information predicting an engine stop. In this case, the likelihood of the engine stop prediction can be improved.

In this embodiment, like in the first embodiment, the electric power is supplied to the CPU 104, the flash memory 102 and the main memory 103 from the battery 1 via the key switch 2. On the other hand, as shown in FIG. 3, the electric power may be supplied to the CPU 104, the flash memory 102 and the main memory 103 through the power supply line 6 from the cigar socket 5 connected to the battery 1 via the key switch 2.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-304441 filed on Sep. 28, 2001 and 2001-266389 filed on Sep. 3, 2001 including the specification, claims, drawings and summary incorporated herein by reference in its entirety.

What is claimed is:

1. An electronic apparatus, wherein the electric power is fed thereto from an electric power supply installed in a movable body, and data representing an operation state of the electronic apparatus upon interruption of the power feeding thereto is recorded into a memory device, the electronic apparatus comprising:

an acquiring device for acquiring moving information representing a moving state of the movable body;

a predicting device for predicting an occurrence of interruption of the power feeding based on the acquired moving information; and a writing device for writing the data into the memory device when the occurrence of interruption of said power feeding is predicted.

2. The electronic apparatus according to claim 1, wherein the movable body moves relying on the motive power, and the electric power is fed to the electronic apparatus while the motive power is active;

the predicting device predicts stopping of the motive power of the movable body based on the acquired moving information and further predicts the occurrence of interruption of the power feeding by predicting the stopping of the motive power; and the writing device writes the data into the memory device when the stopping of the motive power of the movable body is predicted.

3. The electronic apparatus according to claim 1, wherein the moving information includes at least one of stop information, speed information, acceleration information and vibration information of the movable body.

4. The electronic apparatus according to claim 3, wherein the moving information is any one of the speed information, the acceleration information and the vibration information and, when a value of the speed information, the acceleration information or the vibration information acquired by the acquiring device is no greater than a predetermined threshold value, the predicting device predicts the occurrence of interruption of the power feeding.

5. The electronic apparatus according to claim 1, wherein the electronic apparatus further comprises the memory device comprising a nonvolatile memory.

6. An electronic apparatus, wherein the electric power is fed thereto from an electric power supply installed in a movable body, and data representing an operation state of the electronic apparatus upon interruption of the power feeding thereto is recorded into a memory device, the electronic apparatus comprising:

a recognizing device for acquiring position information of the movable body to recognize a current position of the movable body;

a storing device for storing point information about one or more points registered in advance;

a predicting device for predicting an occurrence of interruption of the power feeding when the current position of the movable body is recognized within a preset region from the stored point; and a writing device for writing the data into the memory device when the occurrence of interruption of the power feeding is predicted.

7. The electronic apparatus according to claim 5, wherein the electronic apparatus performs a route search for the movable body based on information about a destination of the movable body and the recognized current position of the movable body, thereby to set a route to the destination of the movable body;

the storing device stores, as the point information, the destination or a stop-by point registered upon setting the route;

the predicting device predicts the occurrence of interruption of the power feeding when the current position of the movable body is recognized within the preset region from the stored destination or the stored stand-by point; and the writing device writes the data into the memory device when the occurrence of interruption of the power feeding is predicted.

8. A data recording method in an electronic apparatus, wherein the electric power is fed thereto from an electric power supply installed in a movable body, and data representing an operation state of the electronic apparatus upon interruption of the power feeding thereto is recorded into a memory device, the data recording method comprising:

an acquiring process of acquiring moving information of the movable body;

a predicting process of predicting an occurrence of interruption of the power feeding based on the acquired moving information; and a writing process of writing the data into the memory device when the occurrence of interruption of the power feeding is predicted.

9. The data recording method in an electronic apparatus according to claim 8, wherein the movable body runs relying on the motive power, and the electric power is fed to the electronic apparatus while the motive power is active;

the predicting process predicts stopping of the motive power of the movable body based on the acquired moving information and further predicts the occurrence of interruption of the power feeding by predicting the stopping of the motive power; and the writing process writes said data into the memory device when the predicting process predicts the stopping of the motive power of the movable body.

10. The data recording method in an electronic apparatus according to claim 8, wherein the moving information includes at least one of stop information, speed information, acceleration information and vibration information of the movable body.

11. A data recording method in an electronic apparatus, wherein the electric power is fed thereto from an electric power supply installed in a movable body, and data representing an operation state of the electronic device upon interruption of the power feeding thereto is recorded into a memory device, the data recording method comprising:

a recognizing process of acquiring position information of the movable body to recognize a current position of the movable body;

a predicting process of predicting an occurrence of interruption of the power feeding when the current position of the movable body is recognized within a preset region from point information representing one or more points registered in advance; and a writing process of writing the data into the memory device when the occurrence of interruption of the power feeding is predicted.

12. The data recording method in an electronic apparatus according to claim 11, wherein the electronic apparatus performs a route search for the movable body based on information about a destination of the movable body and the recognized current position of the movable body, thereby to set a route to the destination of the movable body;

the predicting process predicts the occurrence of interruption of the power feeding when the current position of the movable body is recognized within the preset region from the destination or a stand-by point registered upon setting the route; and the writing process writes the data into the memory device when the occurrence of interruption of the power feeding is predicted.

* * * * *